United States Patent
Yedid Am et al.

(10) Patent No.: US 9,946,187 B2
(45) Date of Patent: Apr. 17, 2018

(54) DETERMINING SETTINGS FOR ARRAYS OF PRINTING COMPONENTS

(71) Applicant: Hewlett-Packard Indigo B.V., Amstelveen (NL)

(72) Inventors: Tsafrir Yedid Am, Nes Ziona (IL); Haim Vladomirski, Rehovot (IL); Pavel Blinchuk, Nes Ziona (IL)

(73) Assignee: HP Indigo B.V., Amstelveen (NL)

( * ) Notice: Subject to any disclaimer, the term of this patent is extended or adjusted under 35 U.S.C. 154(b) by 0 days.

(21) Appl. No.: 15/114,802

(22) PCT Filed: Jan. 31, 2014

(86) PCT No.: PCT/EP2014/051950
§ 371 (c)(1),
(2) Date: Jul. 27, 2016

(87) PCT Pub. No.: WO2015/113630
PCT Pub. Date: Aug. 6, 2015

(65) Prior Publication Data
US 2016/0342107 A1   Nov. 24, 2016

(51) Int. Cl.
*G03G 15/04* (2006.01)
*G03G 15/043* (2006.01)
(Continued)

(52) U.S. Cl.
CPC ............ *G03G 15/043* (2013.01); *B41J 2/473* (2013.01); *G03G 15/04072* (2013.01);
(Continued)

(58) Field of Classification Search
CPC .................................................... G03G 15/043
(Continued)

(56) References Cited

U.S. PATENT DOCUMENTS

| 6,678,042 B2 | 1/2004 | Tabirian et al. |
| 7,301,548 B2 | 11/2007 | Zhang et al. |

(Continued)

FOREIGN PATENT DOCUMENTS

| WO | WO-2011/008269 A1 | 1/2011 |
| WO | WO-2012/010202 A1 | 1/2012 |

OTHER PUBLICATIONS

Ben-Ezra, M etal ~ Jitter-Camera: High Resolution Video from a Low Resolution Detector ~ Columbia Research Paper ~ Apr. 2004 ~ 26 pages.

(Continued)

*Primary Examiner* — Quana M Grainger
(74) *Attorney, Agent, or Firm* — HP Inc. Patent Department (57) ABSTRACT

A method of controlling a print engine, the method comprising: printing a first test image including a number of scans of printing components at a first setting of the array of printing components; printing at least a second test image by a number of scans of the printing components at a modified setting of the array of printing components, the modified setting being different from the first setting, wherein the modified setting provides a modified setting for each one of the printing components which is varied according to the position of the respective printing component in the array; optically scanning the printed test images and determining the distinctiveness of a scan band within the printed test images for each one of the test images; and deriving an optimum setting of the array of printing components from a comparison of the determined distinctiveness.

14 Claims, 7 Drawing Sheets

(51) Int. Cl.
*B41J 2/47* (2006.01)
*G06K 15/02* (2006.01)
*G06K 15/12* (2006.01)
*H04N 1/40* (2006.01)
*H04N 1/60* (2006.01)

(52) U.S. Cl.
CPC ....... *G06K 15/027* (2013.01); *G06K 15/1261* (2013.01); *H04N 1/40037* (2013.01); *H04N 1/6038* (2013.01)

(58) Field of Classification Search
USPC .......................................................... 399/4
See application file for complete search history.

(56) References Cited

U.S. PATENT DOCUMENTS

| | | |
|---|---|---|
| 7,688,362 B2 | 3/2010 | Glenn |
| 7,847,940 B2 * | 12/2010 | Karasyuk ............... G02B 5/201 347/241 |
| 7,884,861 B2 | 2/2011 | Vertoprakhov |
| 8,472,756 B2 | 6/2013 | Cheng |
| 2002/0196473 A1 | 12/2002 | Patten et al. |
| 2005/0162512 A1 | 7/2005 | Seakins |

OTHER PUBLICATIONS

Microsoft ~ "Image Magnifier" ~ http://www.windowsphone.com ~ retrieved Jul. 26, 2016 ~ 5 pages.

\* cited by examiner

DETERMINING SETTINGS FOR ARRAYS OF PRINTING COMPONENTS

BACKGROUND

Fast printing, such as with a digital press, generally involves simultaneously writing multiple pixels; thus for example, the liquid electro-photographic (LEP) presses write successive swathes of multiple lines of pixels across a photoconductive medium using multiple laser beams in parallel.

BRIEF DESCRIPTION OF THE DRAWINGS

Examples of the disclosure will now be described, by way of non-limiting example, with reference to the accompanying diagrammatic drawings, in which.

DETAILED DESCRIPTION

In a digital printer, uniformity between and within swathes is desired, but not always achieved. When a swathe is not perfectly formed, a periodical disturbance, known as scan band may appear in the printed image. This disturbance may have a variety of causes, such as power non-uniformities between the lasers scanning the photoconductive medium, variances in laser spot sizes and intensity of the light emitted. These variations can be induced, for example, by thermal, mechanical or electrical variations, assembly, misalignment or cross-talk during use. Further, optical variations or fringe effects can occur with the result that light power may be less effectively distributed at the extreme edges of a scan pattern than it is in the center of a scan line or vice versa. Such non-uniformities may be spread across a printed sheet at a pitch which is determined by physical, characteristics of the print engine, depending on the width of an array of laser elements used, for generating the parallel laser beams. This pitch tends to correspond to a visible frequency range disturbing to a human looking at the printed image.

The examples described below provide a method of controlling a print engine and a digital printer in which a scan band artifact can be reduced or suppressed by indirectly measuring said phenomenon. As described below, this allows to fix a high resolution, phenomenon using a lower solution measuring device, such as an in-line camera, in-line scanner, in-line spectrophotometer or the like which usually is provided in a digital printer.

To facilitate an understanding of bow a repeating scan band artifact may arise, a brief description is given below of a known form of liquid electrophotographic printing (LEP) print engine, it being understood that examples of the control tool of this disclosure can be used to evaluate the output of any type of print engine (including inkjet printers as well as laser printers) provided the basic characteristics of the print engine that give rise to the scan band artifact are known.

Figure 1:
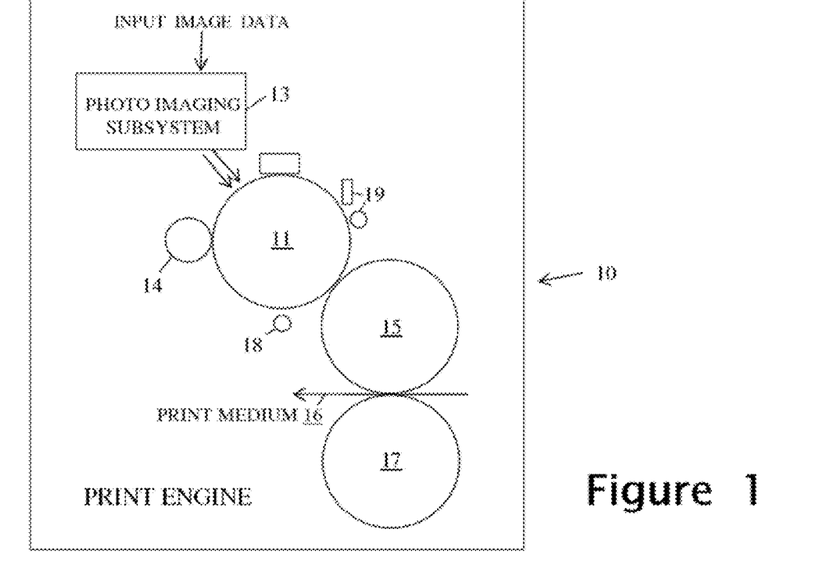
FIG. 1 is a diagram of an example of electro-photographic print engine.

FIG. 1 is a block diagram illustrating the basic components of an example known LEP print engine 10. In the print engine 10 a uniform electrostatic charge is applied, by a charge roller or other suitable charging device 12, to a photoconductive drum 12 (for example, formed by a thin film of photoconductive material, commonly referred to as a photo imaging plate (PIP), wrapped around the outer surface of a cylindrical body). After the drum has been folly charged, a photo imaging sub-system 13 exposes selected areas of the photoconductive drum 11 to light in the pattern of the desired printed image thereby dissipating the charge on the areas exposed to the light. In discharge area development (DAD), for example, the discharged areas on the drum 11 form an electrostatic image which corresponds to the image to be printed. This electrostatic image is said to be a "latent" image because it has not yet been developed into a toner image. A thin layer of liquid toner is then applied to the drum 11 using a developer unit 14, commonly referred to as a binary ink developer (BID), that supplies ink to a small roller that rotates against the drum 11.

The latent image on the drum 11 is developed through the application of the liquid toner which adheres to the discharged areas of the dram 11 in a uniform layer developing the latent electrostatic image into a toner image. The toner image is transferred, from the drum 11 to an intermediate transfer roller 15 which, in an LEP print engine, heats the image, evaporating most of the carrier medium of the printing fluid, leaving a largely solid layer/film of ink to be transferred to the media. 15. From the intermediate transfer roller 15 the image is transferred to the print medium 16 as the latter passes through a nip between the roller 15 and a pressure roller 17. The print medium 16 represents generally any suitable print medium and may be delivered to the print engine 10 as a continuous web dispensed from a roll or as individual sheets. An LED lamp or other suitable discharging device 18 removes residual charge from the drum 11 and toner residue is removed at a cleaning station 19 in preparation for developing the next image or for applying the next toner color plane.

Figure 2:
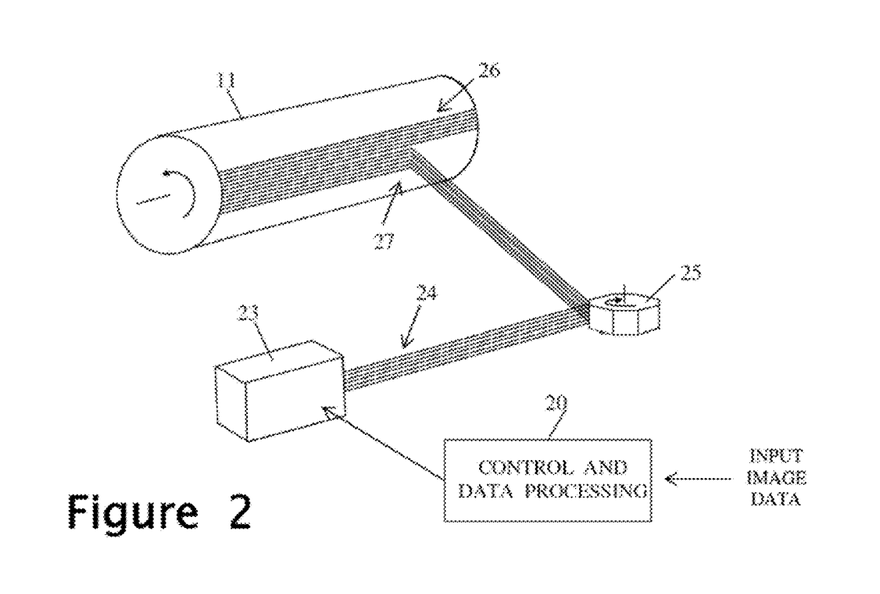
FIG. 2 is a diagram illustrating the general operation of a photo-imaging subsystem of the FIG. 1 print engine according to one example.

The main components of the photo-imaging subsystem 13 are depicted in FIG. 2 and comprise: a control and processing unit 20 that receives digital input image data and controls the other components of the imaging subsystem 13 to write a corresponding latent image on the surface of the photoconductive drum 11; an array of lasers 23 (in this example, six in number) that emit parallel light beams 24 wherein the control and processing unit 20 controls the lasers 23 to modulate the emitted beams 24 in dependence on the input image data: and a rotating polygonal mirror 25 that scans the modulated light beams 24 across the surface of the drum in a direction substantially parallel to the axis of the drum 11. The overall result is that the modulated beams 24 write a latent image on the photoconductive drum 11 in successive swathes of six lines of pixels; in FIG. 2 the swathe currently being written is indicated by arrow 27 and the immediately preceding swathe is indicated by arrow 26. Successive swathes are juxtaposed circumferentially of the dram.

It will be appreciated that, for reasons of clarity, FIG. 2, as well as omitting various components such as lenses, greatly exaggerates the spacing between the laser beams 24, in a practical print engine, such as in some HP Indigo digital presses, an array of e. g. twelve, eighteen or twenty-eight lasers can be used and each swathe written to the photoconductive dram 11 may be approximately 0.37 mm or 0.56 mm or 0.87 mm across (in the circumferential direction of the drum), assuming a laser spot diameter of 31 µm, for example.

Digital printers, such as the HP Indigo presses, write digital images scan by scan wherein each scan is composed of a number of laser beams, such as the 12, 18 or 28 laser beams addressed above. In order to have a smooth and clear image, all of the different laser beams should have the same power. Unfortunately, often the lasers have a power profile across the array of lasers which is not flat wherein this non-uniformity may result from a variation among the individual laser elements and additionally may result from interference between the lasers during operation. While a non-uniform laser profile resulting from variations in the manufacture of the laser elements, for example, could be compensated by a process of pre-calibration, there are other variations which occur only during operation of the lasers, such as thermal or electrical variations and cross-talk and also different optical distribution of the beams. All of these variations result in a disturbance of image smoothness and will be duplicated for each scan so as to create a periodical disturbance, addressed herein as scan band artifacts.

It will be understood that similar and other non-uniformities may be induced by other sources, depending on the specific priming technology, the present disclosure not being limited to the example described.

Figure 3A:
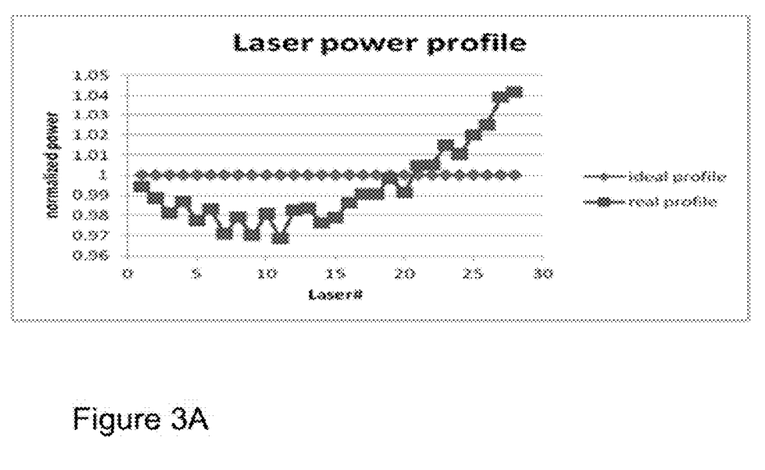
FIG. 3A is a diagram illustrating the effect which a non-uniform power profile of laser elements has on one scan or swathe written on a photoconductive dram of the FIG. 1 print engine according to one example.

FIG. 3A shows a laser power profile of 28 laser beams, generated from an array of 28 lasers in a print engine. In FIG. 3A, the x-axis shows the number of the individual lasers or laser elements in an array, from laser number 1 to laser number 28; and the y-axis shows the normalized laser power wherein 1 (one) indicates 100% of a defined nominal power. The ideal profile of the respective laser elements is shown by a straight line of diamond shaped dots at 1 (one), indicating a constant ideal laser power of 100% of a defined nominal power. During operation, however, the output of each laser element may deviate from said 100% nominal, power by a certain percentage, as shown by the square dots. FIG. 3A shows an example where the laser power of the individual laser elements varies from about 96% of the defined nominal laser power (at 0.96) to 104% of the predefined-nominal power (at 104). This corresponds to a peak-to-peak variation of the laser power of 150% (1.5), in a realistic print engine this peak-to-peak variation of the laser power in the range of about 10% (0.1).

Figure 3B:
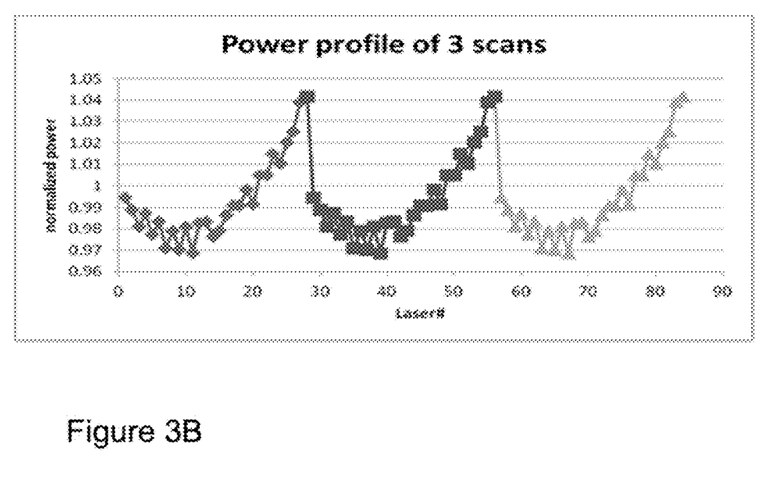
FIG. 3B is a diagram illustrating non-uniform laser profiles within swathes written on the photoconductive drum of the FIG. 1 print engine, according to one example.

FIG. 3B shows the same laser power profile of the 28 laser beams, as in FIG. 3A, over three subsequent scans. In FIG. 3B it can be recognized that the non-uniform laser power profile may generate a visible scan band artifact, assuming the power of each laser element is translated into a corresponding pixel intensity of a printed image.

Figure 4:
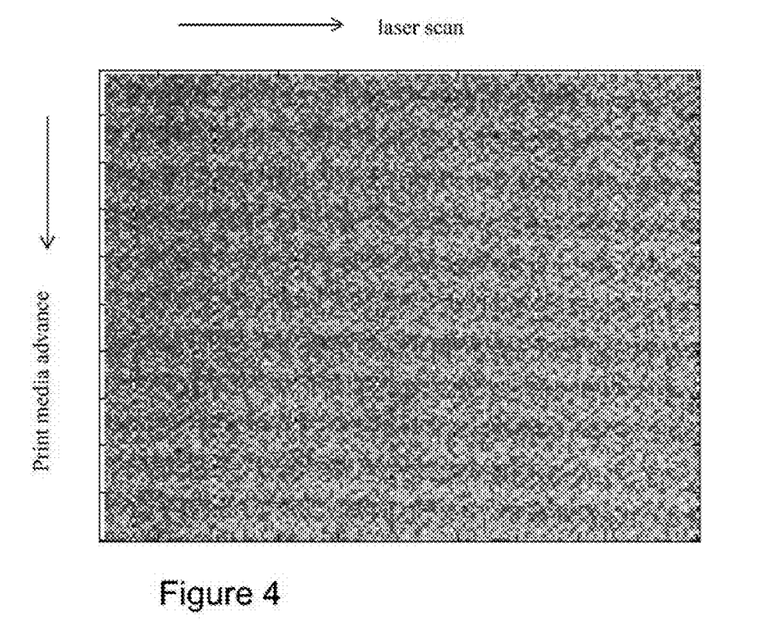
FIG. 4 is an illustration of a printed image produced by a print engine where the laser elements in an array of laser elements have a power profile which is not flat, according to one example.

FIG. 4 shows an enlarged view of an image which has been printed using an initial laser power setting wherein the output power of the array of laser element is non-uniform as shown, for example, in FIGS. 3A and 3B. In FIG. 4 visible scan band artifacts can be recognized. These scan band artifacts occur at a frequency determined by the print engine. In this example, the scan bands will occur at a pitch of 0.875 mm. In FIG. 4, the laser scanning direction is from left to right and the print media advance direction is from top to bottom.

Ideally, one would want to characterize the exact profile of each laser, e.g. by measuring directly the laser power of each laser. This could be done during laser power calibration by turning on a single laser each time and by measuring the intensity of an image printed by only this one laser element, e. g. using an in-lined scanner of the digital printer. As explained above, such a method of calibrating each single laser individually can fail because it turns out that a single laser acts differently when operated among other lasers due to various reasons. Some of the reasons might be electrical and thermal cross talk, differences between the laser power at DC mode and at AC mode, and optical distribution of each laser's beam. Current in-line scanners used in digital printers, however, often do not have a resolution sufficiently high for characterizing a laser profile of an array of laser elements when using all laser elements together.

As discussed, a print engine may generate repeating scan band print artifacts for causes other than non-uniform laser profiles. For example, the print engine 10 may generate a repeating scan band artifact at the rotational frequency of the polygonal mirror 25 due to misalignments in the print engine or inaccurate scanning of swathes. In general, the print engine 10 may generate a repeating scan band artifact as a result of non-uniformity of the half-tone spots between rows.

The present disclosure describes a control tool for a print engine which allows calibrating printing components, such as laser elements within, an array of lasers having a non-uniform profile, by an indirect measurement of the profile. For calibrating the printing components it is not necessary to know the different factors influencing the profile of the printing components or to measure the exact profile but rather the method determines a measure of the distinctiveness of a scan band in different test images printed at different settings of the printing components, as described in further detail below, to obtain information on a scaled-up result of the non-flat profile of the printing components (laser elements in one example).

Generally, the method described below is suitable for evaluating the severity of any specific repeating scan band print artifact (or 'target' repeating scan band artifact) arising from different implementation issue (misalignment, inaccurate set up including those of timing parameters, mismatches between paralleled systems such as multiple write lasers, halftone artifacts, etc.) of the print engine. Knowledge of the cause of the target repeating scan band artifact allows a prior estimate to be made of the expected frequency of the repeating scan band artifact and this information can be used by the control tool to facilitate its operation.

The present disclosure proposes an approach for determining the distinctiveness of the scan bands within printed test images wherein a number of test images including a number of scans each are printed at different settings of the printing components (laser elements in one example); each printed test image is scanned and the distinctiveness of a scan band within the printed test image is determined for each test image; an optimum setting of the array of the printing components is derived from the comparison of the determined distinctiveness. In varying the settings of the printing components, the control tool provides for a modified setting for each one of the printing components which is varied according to the position of the respective component in the array, in the examples described below, a modified power of each of the laser element is determined by a polynomial term as a function of the position of the respective laser element. This polynomial term may include a linear term and/or a parabolic term. For laser elements, the general structure of this polynomial term can be found using basic knowledge of the non-uniformity of the laser profile wherein experience shows that a polynomial term including a first order term and a second order term achieves good results in compensating the non-uniformities of the laser profiles shown in FIGS. 3A and 3B. For other printing components, other terms may be used. The control tool of this disclosure uses a combination of an empiric approach and an analytic approach for determining the best settings of the printing components.

Generally speaking, the control tool modifies the power settings of the laser elements on the basis on some fundamental knowledge about the behavior of the laser elements during operation. For example, the laser power can be varied across the array of laser elements using a polynomial term which is a best fit to the power profile of the laser elements. However, the control tool does not need to have knowledge on the specific effects of different influencing factors to find an optimum setting of the laser elements, rather different modified settings are "tried out". In this regards, the control tool can be considered to implement a "black box" approach. Besides knowing the approximate distribution of the power profile of the laser elements, for selecting a suitable polynomial term, it is advantageous to also know the approximate scan band frequency in order to quickly determine the distinctiveness or severity of scan bands.

Figure 5:
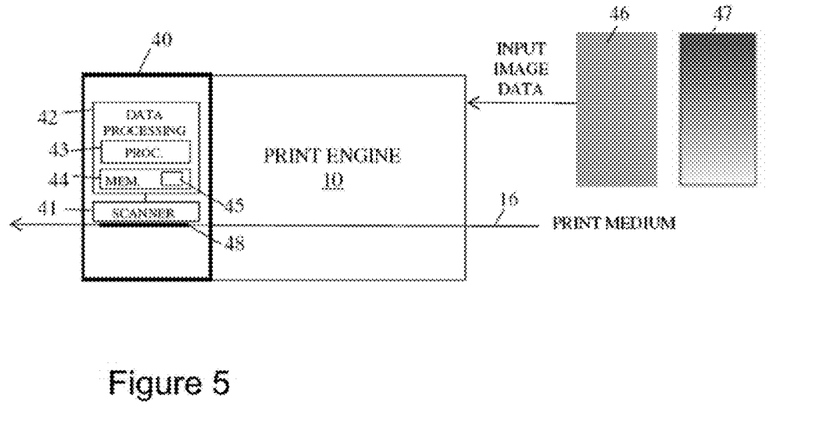
FIG. 5 is a diagram illustrating an example of a control tool in a digital printer.

As example of a control tool is depicted in FIG. 5 in the form of an in-line module 40 positioned on the downstream side of the print engine 10 and arranged to evaluate repeating scan band artifacts that may be present in printed images 48 produced by the print engine 10 on the print medium 16.

As depicted in FIG. 5, the control tool 40 of this example comprises a scanner or other image capture device (such as a camera) 41 for electronically capturing a data representation of the printed image of interest 48, and a data processing subsystem 42 that can be in the form, of a program controlled processor 43 and associated memory 44. The memory 44 holds a program 45 for controlling the processor 43 to process the captured printed-image representation such as to evaluate the distinctiveness of the scan band artifact, if present; the memory 44 also serves as a temporary store both for the captured representation and the processing results. It will be appreciated that the data processing subsystem 42 may take other forms such as dedicated hardware (for example an ASIC or suitable programmed field programmable array). The control tool 40 provides different settings for the printing components of the print engine 10, such as different power settings for the laser elements.

Figure 6:
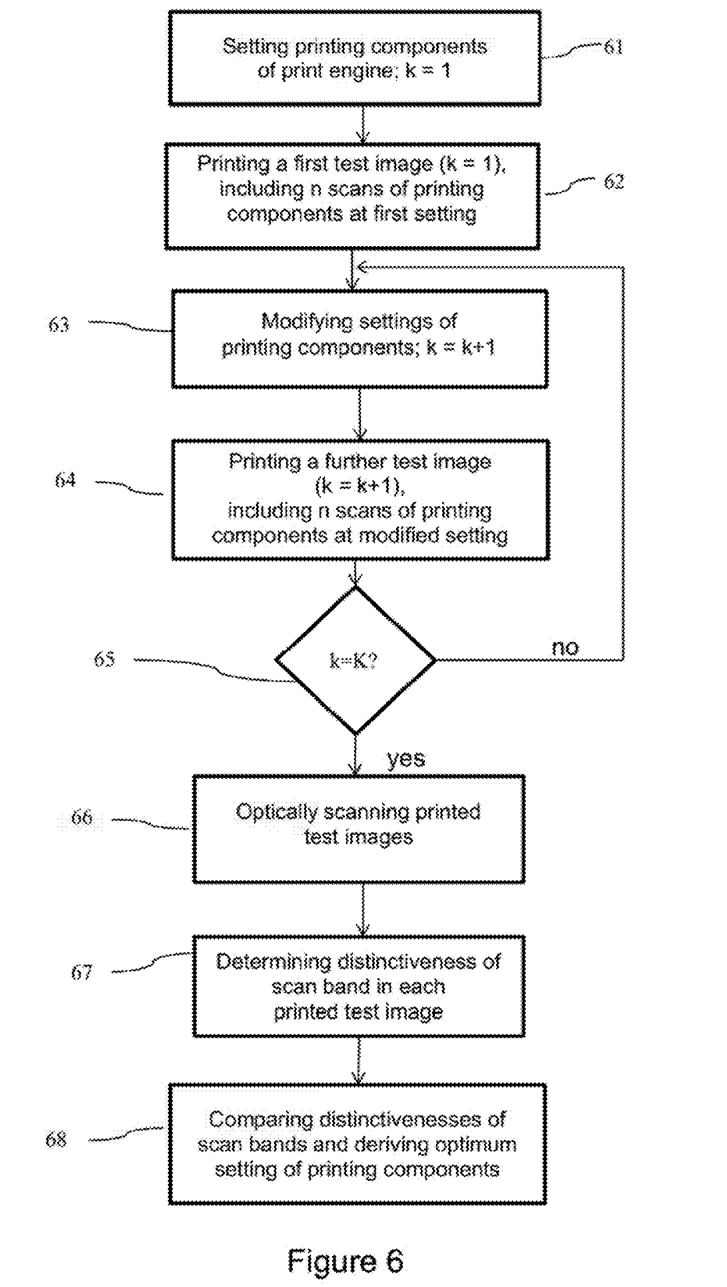
FIG. 6 is a flow chart illustrating an example of a control process implemented in the control tool.

FIG. 6 is a flow chart depicting the steps carried out by the control tool 49 for controlling the print engine according to one example. The general operation of the control tool 40 can be described by the following steps;

In a first step 61, printing components of the print engine are set; for example, the power of the user elements of the print engine set to a pre-calibrated nominal power which, for each of the laser elements, may be determined such that the laser elements generate a uniform output when activated individually. Alternatively, the first setting of the printing components can be a uniform setting for each of the components, such as a constant input power, or any other pre-determined settings.

Using this first setting (k=1), in step 62, a first test image is printed, the test image including n scans of the laser elements at said first setting. The test image can be a uniform grayscale image or grayscale gradient. Furthermore, the test images may differ from uniform grayscale and gradient images depicted in FIG. 4; a test image should, however, have one or more known regions that are relatively smooth, non-saturated, and free of feature exhibiting a spatial frequency around the expected frequency of the target repeating band artifact, thereby enabling the patches to be taken from the known regions without the need for further analysis.

In a next step 63, the settings of the printing components are modified according to some defined rule, for example according to a defined polynomial term, as will be explained further below. The counter k will be incremented by 1. In step 64, a further test image is printed using the modified settings of the printing components, said further test image again including n scans.

In step 65, the number of test images printed is checked wherein the process provides for printing at least two test images (k=2). In different examples of this disclosure, the number of printed test images can be in the range from 2 to 20 or, from 4 to 12, or k=4, for example, without being bound to any specific number of printed test images.

If the number of printed test images is below a predefined number K, as determined in step 65, step 63 and 64 are repeated. If on the other hand, K test images have been pruned, the process proceeds to step 66, where the pruned test images are optically scanned. Scanning can be performed by using a scanner provided in the digital primer, such as an in-line scanner, in-line camera, in-line spectrophotometer or any other image capture device. While the scanner can be preferably is one which would be provided in the digital printer anyway, such as for color calibration, skew detection or the like, it is also possible to provide a dedicated scanner for performing step 66.

In step 67, for each of the printed test images, the distinctiveness of a scan band is determined, as described in further detail below. A value of the distinctiveness of the scan band can be attributed to each printed test image. In step 68, the distinctiveness determined for each of the test images are compared to derive an optimum setting of the printing components which usually would be one at which a lowest distinctiveness of the scan, band is achieved. This setting can be used during operation of the print engine for calibrating or biasing the printing components.

Notwithstanding the wide applicability of the control tool to the evaluation of repeating scan band artifacts, in order to facilitate explanation of the control tool, in the following description where it is referred to the specific nature of the repeating scan band print artifact being evaluated, an artifact resulting from a non-uniform laser profile will be considered.

The different stages of the flow chart of FIG. 6 now are described in further detail, according to one example. For illustrating this example, it will be assumed that the dot diameter of a single laser beam is about 31 μm and one scan is composed from 28 laser beams and hence has a scan band which is 875 μm wide. Due to the non-flat profile of the laser elements, scan band artifacts with a period of 875 μm can be perceived, as shown in FIG. 4. Further, in this example, each test image will comprise twelve scans and eleven different power settings of the array of laser elements shall be used for printing eleven different test images.

The above numbers are examples and the person of average skill in the art will be able to select different numbers of laser elements, scans per image and a number of test images. A common in-line scanner provided in a digital, printer might operate at a resolution of 300 dpi, 600 dpi or even 800 dpi but usually would not have sufficiently high resolution to directly measure pixel intensities produced by individual laser elements within said profile. In order to directly measure the profile of the lasers intensity per laser, the resolution of the measurement tool should be at least 2 times bigger than the spot diameter; in the described example, this would require a resolution of about 1600 dpi.

In step 61, the power profile of the laser elements is set so that each laser element is operated at a predetermined pre-calibrated power which may have been determined in advance so as to compensate for manufacturing tolerances of the laser elements. In step 62 a first test images is printed, including twelve scans of the laser elements, using said first setting. An example of said first test image is shown in FIG. 4, wherein the digital input of the print engine corresponds to a uniform grayscale image but the resulting test print clearly exhibits disturbances (scan bands) at a period of the scan band widths, such as 875 µm. FIG. 4 is an enlarged view of such a test image so as to better illustrate the intensity of the scan bands.

Figure 7A:
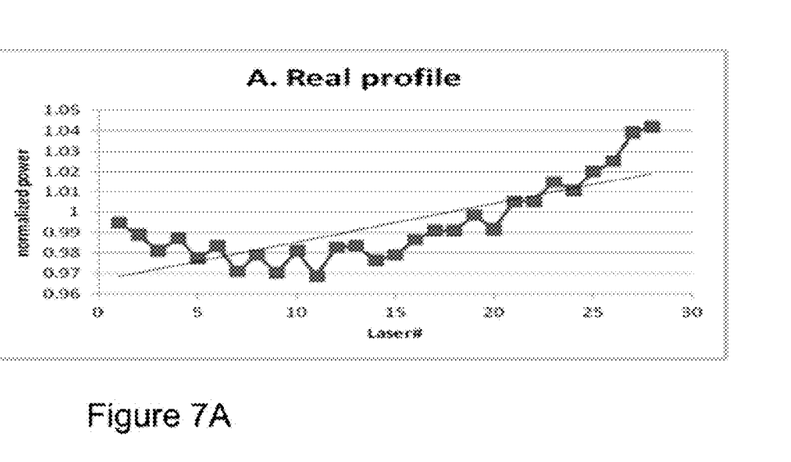
FIG. 7A to 7D are diagrams illustrating the effect of a non-uniform power profile of the laser elements within an array of laser elements in the print engine and how this effect is compensated, according to one example.

FIG. 7A shows an output power profile of a laser array of 28 laser elements wherein if can be recognized that the array of laser elements produces a higher intensity at the edges when compared to laser elements in the middle of the array and, additionally, produces a higher output intensity at the last laser in the array when compared to the first laser in the array. In this example, the peak-to-peak variation of the laser power is about 10%. A straight line in FIG. 7A is a linear approximation of the actual laser power profile.

After the first test image has been, printed, in step 63, the settings of the laser elements are modified wherein, in one example, this modification can be described by a polynomial term which is a function of the position of the respective laser elements in the array, i.e. which provides a different modified setting for each of laser elements in the array according to its position. The polynomial term may comprise a linear component or a parabolic component or a combination of linear and parabolic components. If a linear polynomial term is used, the control tool may compensate any linear deviations between the intensity valises produced by the individual laser elements. If the parabolic term is used, the control tool may compensate any deviations which can be approximated by a parabolic term. Considering the power profile of the laser elements shown in FIG. 7A, which has been found to be an at least approximately realistic, power profile of laser elements used in digital printer, it has been found that the combination of a linear term and a parabolic term produces very good results in approximating and hence compensating deviations between individual laser elements in the array of laser elements.

In one example, in step 62, the settings of the laser elements are modified by using a modified power profile, power'(i), for the array of laser elements, wherein i indicates the posit it in of the individual laser element in the array:

$$\text{power}'(i) = \text{power}(i) \cdot \left(1 + \text{slope}_k \cdot \frac{i-a}{b}\right) \cdot \left(1 + \text{parabola}_k \cdot \left(\frac{i-a}{b}\right)^2\right)$$

wherein i=1 ... L, for an array of L laser elements;
power(i) is a predetermined nominal power of the ith laser element in the array of L laser elements;
power'(i) is the modified power of the ith laser element in the array of L laser elements;
$\text{slope}_k$ and $\text{parabola}_k$ are scaling factors used for the kth test image; and
a and b are parameters for assigning the modified power across the array of L laser elements.

In one example, a corresponds to the central channel in the array of laser elements. If 28 laser beams are used, a can be selected as a=(1+28)/2=14.5, so the linear profile is anti-symmetric and the parabolic profile is symmetric around the center of the laser profile, b is a scaling factor for determining scaling of the power distribution among the laser elements. When b is selected as b=2a, the distance between the maximum and the minimum laser beam power will be equal to the slope.

This process finds the leading coefficients of the polynomial term which influence the most the non-flatness of the power profile. Any deviation from a flat profile (a flat profile would correspond to a constant output intensity of the laser elements corresponding to 100% of some nominal value) which can be approximated by a linear term (see FIG. 7A) will be compensated by the linear component of the parabolic term and any deviation which can be approximated by a parabolic term (see FIG. 7C) will be compensated by the parabolic component of the polynomial term. By adjusting $\text{slope}_k$ and $\text{parabola}_k$ for different modified settings for printing different test images, a setting can be determined which compensates best the actual power profile of the array of laser elements. The scaling factors, $\text{slope}_k$ and $\text{parabola}_k$, can assume values between −0.1 and 0/1 (1 corresponding to a laser power deviation of 10%), for example, so the difference between extreme laser beams will be 10% and the resolution can be 0.01 (1%), for example, $\text{slope}_k$ and $\text{parabola}_k$ can be increased or decreased monotonously from test image to test image, e.g. in steps of 00.1 or any other suitable value, depending on the number of test images to be printed. The parameters a and b of the polynomial term will depend on the number of laser elements in the array and, in one example, can be selected to bea=(L+1)/2 and b=2a for an array of L laser elements. In another example, a=(L+1)/2 and b=(L−1)/2. The number of test images k to be printed can be in the range of 2 to 20, or 4 to 12, or k=4, for example; and the number n of scans per image can be in the range of 2 to 50, or 5 to 20, or about 10, or n=9, for example, without being limited to any particular number of scans, except that there should be at least two scans per test image.

In the sequence of steps 63, 64 and 65, K−1 further test images will be printed using K−1 modified settings which are determined according to the above polynomial term or any other suitable polynomial term which can be conceived by the person of ordinary skill in the art.

Figure 7B:
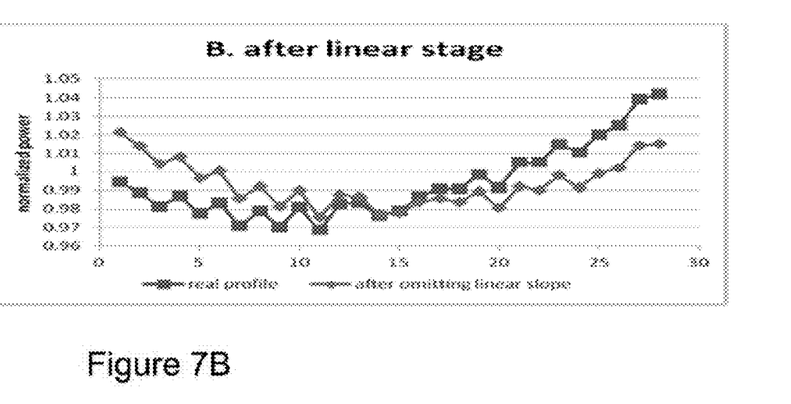
Figure 7C:
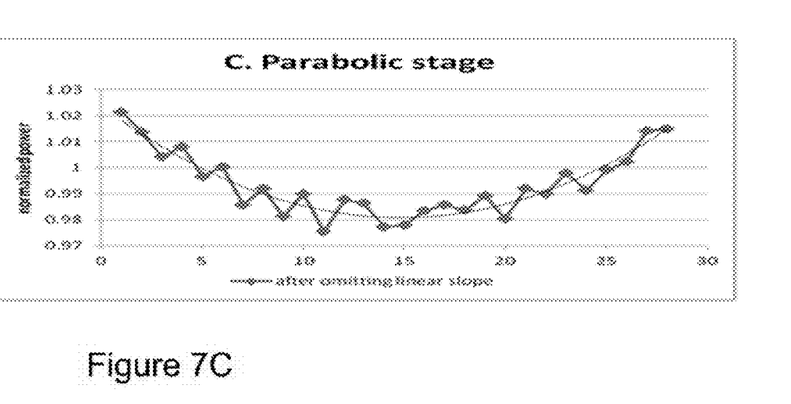
Figure 7D:
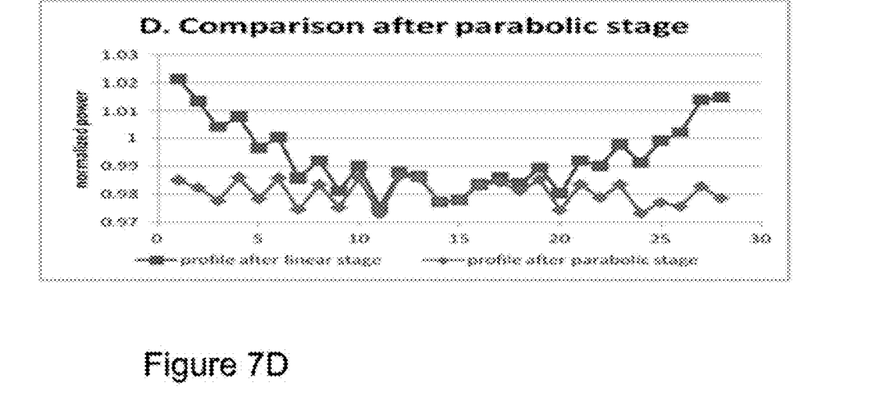

FIGS. 7A to 7D illustrate how the setting of the laser elements, which is modified according to a polynomial term as described above, may compensate the deviations of output intensity of an array of laser elements having a profile as shown in FIG. 7A. The linear term of the polynomial will compensate for any deviations which can be approximated by a linear curve, as shown in FIG. 7B, so that the profile illustrated by the diamond-shaped symbols will be shifted to a profile illustrated by the square symbols in FIG. 7B which, in average, is more flat than the profile of FIG. 7A. The shifted profile of FIG. 7B can be approximated by a parabolic term, as shown in FIG. 7C. Considering a corresponding parabolic term in modifying the settings of the laser elements, hence allows to compensate for the parabolic distribution of output intensity among the laser elements. The lighter squares in FIG. 7D illustrate the laser power profile after compensation with a linear term and a parabolic term.

A best approximation of the initial power profile of the laser elements, shown in FIG. 7A, is determined empirically by printing the number of test images and then, in step 66, optically scanning the printed test images and, in step 67, determining the distinctiveness of the scan band in each printed test image. A comparison of the distinctiveness of the scan bands in the various test images performed in step 68, can yield an optimum setting of the laser components, i.e. one which will compensate best for any deviations of the initial power profile of the laser elements from an ideal flat profile corresponding to a constant value of 100% of some nominal output power or pixel intensity. This empiric process will yield an adjusted setting of the laser elements including a linear and a parabolic component that compensates best the initial power profile.

In one example, the printed test images, in step 66, are optically scanned using an in-line scanner of the digital printer. The in-line scanner measures color intensity values of the printed image, such as the one shown in FIG. 4, in the direction of print medium advance, i.e. perpendicular to the laser element scanning direction. The scanner derives intensity values of the printed image at a resolution which may be lower than the resolution of the laser elements, such as 600 dpi or even 300 dpi.

By way of example, where the target repeating scan band artifact is caused by a non-uniform laser profile, it is relatively straightforward to determine from the print engine the pitch and therefore the spatial frequency of the target repeating scan band artifact; for values of the pitch p of 0.37 mm, 0.56 mm and 0.8 mm, for example, the repeating scan band artifact will have a spatial frequency of $1/0.37=2.66$ mm$^{-1}$ $1/0.56=1.77$ mm$^-$, or $1/0.87=1.19$ mm$^{-1}$, respectively.

As the scan hand period/frequency is known, the control tool can easily calculate an amplitude of each scan band using Fourier analyses or correlation, for example. In one example, the control tool calculates an amplitude of the scan band frequency in the Fourier space for each printed test images. Fourier analysis can also be used to identify spatial frequency components around the expected frequency of a target repeating scan band. For this the Fast Fourier Transform, FFT, (which is the fast implementation of the Discrete Fourier Transform) can be used; other Fourier-related transforms such as the Discrete Time Fourier Transform, DTFT, can alternatively be used.

The FFT can be applied to the intensity values captured by the scanner in a range of frequencies around the expected frequency or at the expected frequency of the target repeating band artifact, such as 1/875 μm.

This stage of operation of the control tool (step 67 of FIG. 6) can return a single value for the distinction of the target repeating scan band for the printed image under consideration. Other ways of deriving an overall scan band distinction value of a printed image (expressed in terms of an amplitude, for example) are possible including taking the median value and correlation processing.

In step 68, these scan band distinctiveness measures (e. g. amplitudes) at the scan band frequency, for each of the printed test images, are compared to each other to select the test image having the lowest amplitude corresponding to the distinctiveness of respective scan bands.

Figure 8:
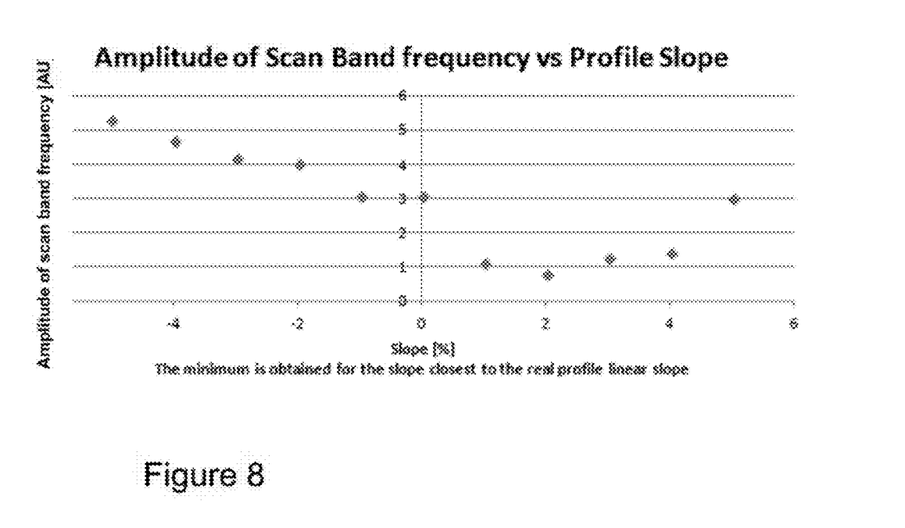
FIG. 8 is a diagram illustrating the distribution of a distinctiveness of scan bands within printed test images for a number of different settings of the laser elements, according to one example.

FIG. 8 shows an example where respective amplitudes of scan band frequencies have been determined after a linear compensation of the power profile of the laser elements, i. e. after modifying the settings of the laser elements according to a parabolic term including a linear component $$\left(1 + \text{slope}_k \cdot \frac{i-a}{b}\right).$$

The x-axis indicates the different values of slope$_k$ used in the ith iteration of the printed test image, from −6% to +6%. The y-axis shows the resulting amplitude of the scan band frequency in percent, "0" indicating a 0% peak-to-peak deviation of pixel intensities produced by the laser elements, and "5" indicating a 5% peak-to-peak deviation between the pixel intensities generated by the individual laser elements in the array of laser elements, etc. However, as only the minimum of the amplitudes is determined to find the optimum laser profile, absolute values are not critical and a different type of scaling can be selected. FIG. 8 indicates that, if a linear polynomial (approximation) is used, a modification of the initial power setting by the term:

$$\text{power}'(i) = \text{power}(i) \cdot 1 + 0.02 \cdot \frac{(i-a)}{b}$$

will yield a minimum amplitude at the scan band frequency and hence a minimum distinctiveness of the scan band. It is to be expected that, when also a parabolic term is used, the distinctiveness of the scan bands can be reduced even further.

Figure 9:
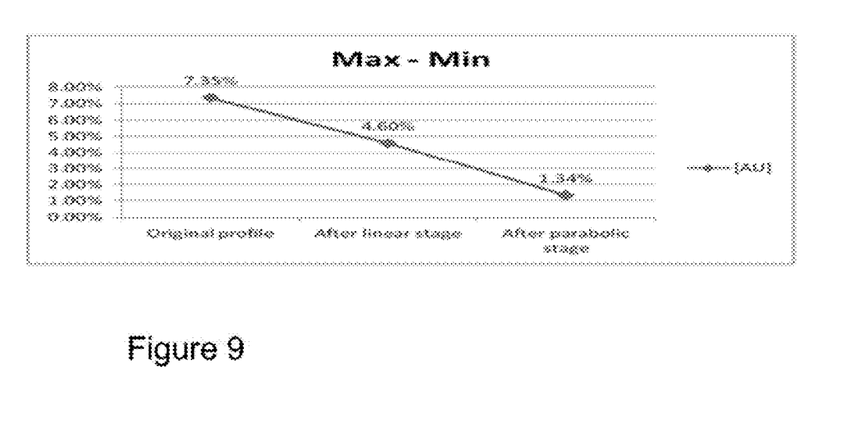
FIG. 9 is a diagram illustrating how scan band artifacts are suppressed by the control tool of this disclosure, according to one example.

This is illustrated in FIG. 9 which depicts the peak-to-peak deviation of pixel intensities produced by the individual laser elements in an array of laser elements, using an initial setting of the laser power, a setting modified by a linear polynomial term and a setting modified by a polynomial term having both a linear component and a parabolic component, when compared to an ideal flat profile. While the ideal flat profile is represented by a peak-to-peak deviation of 0.00%, FIG. 9 also shows that the method described can reduce the peak-to-peak deviation from about 7.5% to about 1.5%.

The control tool hence can approximate and compensate the non-uniform laser power profile with good accuracy although the in-line scanner or other scanning device has the resolution which would be too low to directly measure the laser power profile for feedback control. Rather, the control tool measures the distinctiveness of the scan band artifacts at a known or approximated scan band frequency and evaluates the distinctiveness of the scan band artifacts using a Fourier analysis, correlation, or other suitable processing method.

While the above example has been described with reference to a printed test image which is a uniform-gray field, the method can also be used in combination with other types of test images, including color images, and images having some pattern. As already indicated, the described control tool can be applied for evaluating the distinctiveness of repeating scan band print artifacts resulting from a variety of causes and produced by different printing technologies. The described control tool avoids the need of measuring laser profiles with high resolution during operation and hence saves costs. It provides calibration abilities wherein the setting of the laser components determined for the test image can be used for calibrating the laser components for then printing any type of digital image that is provided to the print engine.

The invention claimed is:

1. A method of controlling a print engine, the method comprising:
   printing a first test image including a number of scans of printing components at a first setting of the array of printing components;
   printing at least a second test image by a number of scans of the printing components at a modified setting of the array of printing components, the modified setting being different from the first setting, wherein the modified setting provides a modified setting for each one of the printing components which is varied according to the position of the respective printing component in the array;
   optically scanning the printed test images and determining the distinctiveness of a scan band within the printed test images for each one of the test images; and
   deriving an optimum setting of the array of printing components from a comparison of the determined distinctiveness;
   wherein determining the distinctiveness of a scan band within the printed test images comprises: optically scanning each test image, and for each test image, determining an amplitude of the test image at a scan band frequency, and
   wherein deriving an optimum setting of the array of printing components comprises comparing the determined amplitudes of the test images and selecting a setting which resulted in an test image having a low amplitude when compared to other test images.

2. The method of claim 1 wherein the first setting provides a predetermined nominal power to each one of the printing components, and each modified setting provides a modified power to each one of the printing components which is described by a polynomial term as a function of the position of the respective printing component in the array.

3. The method of claim 2 wherein the polynomial term comprises a linear term or a parabolic term or a combined term including a linear component and a parabolic component.

4. The method of claim 3, further comprising:
   printing k test images, each test image including n scans per image, wherein a different modified setting is used for each of the k test images;
   wherein the linear term comprises:

$$\text{power}'(i) = \text{power}(i) \cdot \left(1 + \text{slope}_k \cdot \frac{i-a}{b}\right)$$

wherein
i=1 . . . L, for an array of L printing components,
power(i) is the predetermined nominal power of the ith printing component in the array of L printing components,
power'(i) is the modified power of the ith printing component in the array of L printing components,
$\text{slope}_k$ is a scaling factor used for an kth test image, and
a and b are parameters for linearly distributing the modified power over the array of L printing components; and wherein the polynomial term comprises:

$$\text{power}''(i) = \text{power}'(i) \cdot \left(1 + \text{parabola}_k \cdot \left(\frac{i-a}{b}\right)^2\right)$$

wherein
power''(i) is a further modified power of the ith printing component in the array of L printing components, and
$\text{parabola}_k$ is a scaling factor used for the kth test image.

5. The method of claim 4 wherein a=(L+1)/2 and b=2a.

6. The method of claim 4 wherein
   k is an integer number in the range of 2 to 20, or 4 to 12, or k=4; and
   n is an integer number in the range of 2 to 50, or 5 to 50, or n is about 10, or
   n=9.

7. The method of claim 1 wherein the amplitude is determined by Fourier analysis or correlation.

8. The method of claim 7 wherein the amplitude corresponds to a pixel intensity value of a printed test image.

9. The method of claim 7 wherein the printing components are laser elements and the amplitude is determined at a scan band frequency of 1/(L·laser_dot_diameter), wherein L is the number of laser elements in the array.

10. A method of controlling a an array of L laser elements in a digital printer, the laser elements writing scan by scan a digital image, wherein each scan is composed of a number of laser beams generated by the laser elements, the method comprising:
    printing a first test image including a number of scans of the laser elements at a first power setting of the array of laser elements;
    printing further test images, each further test image including a number of scans of the printing components at a modified power setting of the array of laser elements, each modified power setting being different from a preceding power setting, wherein the modified power setting provides a modified control power for each one of the laser elements which is varied according to the position of the respective laser element in the array;
    determining the amplitude of a scan band within the printed test images for each one of the test images by analyzing the test image at a scan band frequency; and
    selecting the test image exhibiting the lowest amplitude for deriving an optimum power setting of the array of laser elements.

11. The method of claim 10 wherein
    determining the amplitude of a scan band within the printed test images comprises: optically scanning each test image using a in-line scanner of the printer, the in-line scanner having a resolution lower than necessary for directly measuring the laser element output power.

12. The method of claim 10 wherein the first power setting provides a predetermined nominal power to each one of the laser elements, determined in pre-calibration step, and each of the modified power settings provides a modified power to each one of the laser elements which is described by a polynomial term as a function of the position of the respective laser element in the array, wherein the polynomial term comprises at least one of a linear term and a parabolic term;
    wherein the linear term comprises:

$$\text{power}'(i) = \text{power}(i) \cdot \left(1 + \text{slope}_k \cdot \frac{i-a}{b}\right)$$

wherein i=1 . . . L, for an array of L laser elements, power(i) is the predetermined nominal control of the ith laser element, power'(i) is the modified power of the ith laser element in the array of L laser elements, $slope_k$ is a scaling factor used for an kth test image, and a and b are parameters for linearly distributing the modified power over the array of laser elements; and wherein the polynomial term comprises:

$$power''(i) = power'(i) \cdot \left(1 + parabola_k \cdot \left(\frac{i-a}{b}\right)^2\right)$$

wherein power''(i) is a further modified power of the ith laser element in the array of L laser elements, and $parabola_k$ is a scaling factor used for the kth test image.

13. A digital printer including a an array of L laser elements, the laser elements writing scan by scan a digital image, wherein each scan is composed of a number of laser beams generated by the laser elements, the digital printer further comprising a printer controller, the printer controller including an image processor which converts instructions from a digital file into control instructions for controlling the digital printer to:

print a first test image including a number of scans of the laser elements at a first power setting of the array of laser elements;

modify the power setting;

print further test images, each test image including a number of scans of the printing components at a modified power setting of the array of laser elements, each modified power setting being different from a preceding power setting, wherein the modified power setting provides a modified control power for each one of the laser elements which is varied according to the position of the respective laser element in the array;

determine the amplitude of a scan band at a scan band within the printed test images for each one of the test images by analyzing the test image at a scan band frequency to determine the amplitude of the scan band at the scan band frequency; and select the test image exhibiting the lowest amplitude at the scan band frequency for deriving an optimum power setting for the array of laser elements.

14. The digital printer of claim 13, further comprising:

a photo imaging plate which is exposed by the array of laser elements;

an in-line scanner for scanning a printed image, the in-line scanner measuring a color value of the printed image along a line perpendicular to the laser element scanning direction, the in-line scanner generating at least two measurements per scan band.

* * * * *

UNITED STATES PATENT AND TRADEMARK OFFICE
CERTIFICATE OF CORRECTION

PATENT NO. : 9,946,187 B2
APPLICATION NO. : 15/114802
DATED : April 17, 2018
INVENTOR(S) : Tsafrir Yedid Am et al.

Page 1 of 1

It is certified that error appears in the above-identified patent and that said Letters Patent is hereby corrected as shown below:

On the Title Page

In item (72), Inventors, in Column 1, Line 1, delete "Nes Ziona" and insert -- Ness Ziona --, therefor.

In item (72), Inventors, in Column 1, Line 3, delete "Nes Ziona" and insert -- Ness Ziona --, therefor.

In the Claims

In Column 12, Lines 25-26, in Claim 10, delete "a an" and insert -- an --, therefor.

In Column 13, Lines 20-21, in Claim 13, delete "a an" and insert -- an --, therefor.

Signed and Sealed this
Sixth Day of November, 2018

Andrei Iancu
*Director of the United States Patent and Trademark Office*